No. 886,508. PATENTED MAY 5, 1908.
J. HORAT.
STEERING DEVICE FOR AUTOMOBILES.
APPLICATION FILED OCT. 22, 1907.
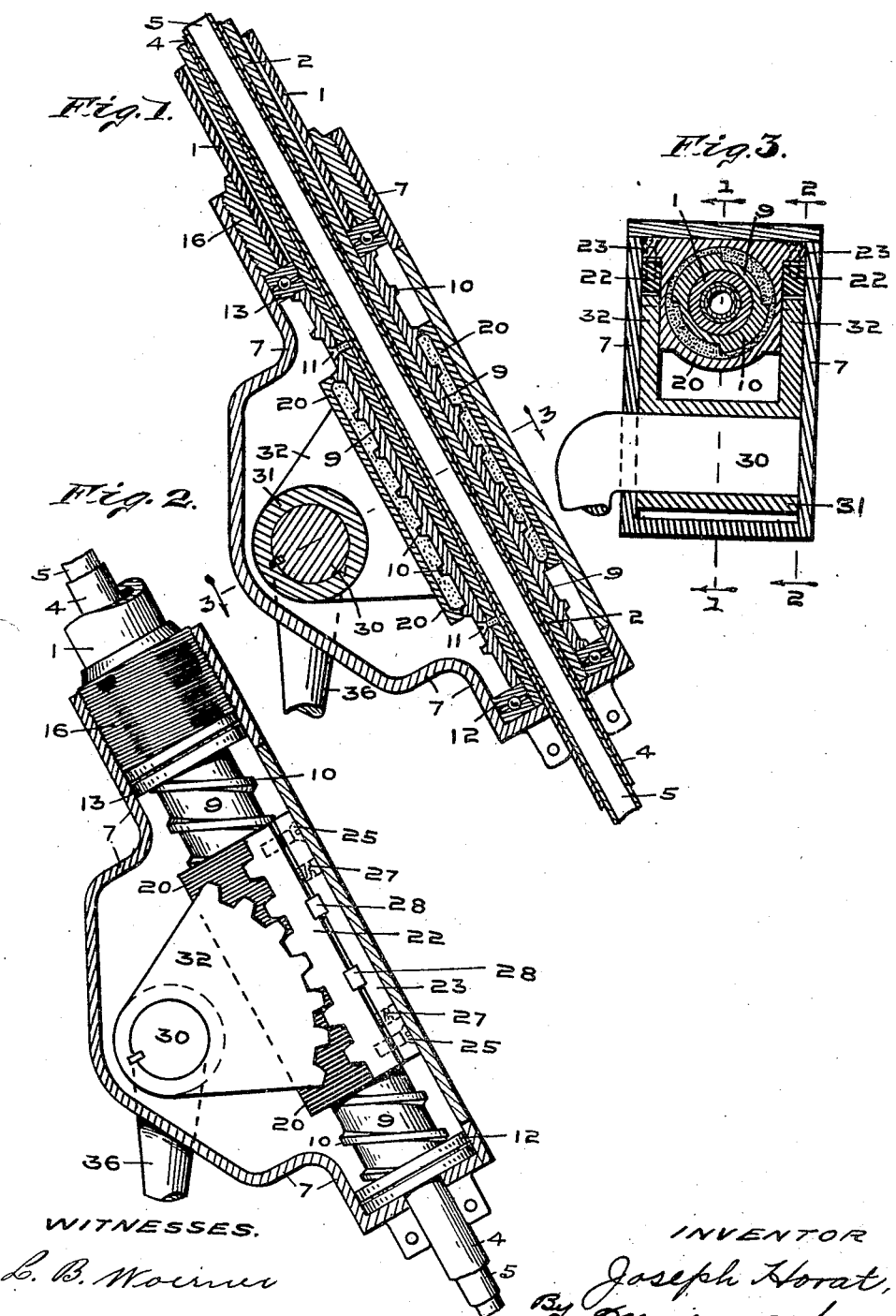
WITNESSES.
INVENTOR
Joseph Horat,
ATT'YS.

UNITED STATES PATENT OFFICE.

JOSEPH HORAT, OF LA FAYETTE, INDIANA.

STEERING DEVICE FOR AUTOMOBILES.

No. 886,508.   Specification of Letters Patent.   Patented May 5, 1908.

Application filed October 22, 1907. Serial No. 398,622.

*To all whom it may concern:*

Be it known that I, JOSEPH HORAT, a citizen of the United States, residing at La Fayette, in the county of Tippecanoe and State of Indiana, have invented certain new and useful Improvements in Steering Devices for Automobiles, of which the following is a specification.

This invention relates to a steering device for automobiles and like vehicles; and the object of the invention is to provide a steering device which will overcome defects which appear in similar devices, and consist of an arrangement of parts to prevent play and at the same time be sensitive so as to readily respond to movement imparted through the steering wheel.

A further object consists in providing a means for housing the steering device so that the same may be inclosed and work in oil, thereby insuring all the parts to be thoroughly lubricative at all times.

I accomplish the objects of my invention by means of the steering device illustrated in the accompanying drawings, forming a part hereof; in which—

Figure 1 is a central vertical sectional view through the steering device, on the line 1—1 in Fig. 3. Fig. 2 is a side elevation of the internal mechanism of the steering device, the outer casing being broken away, on the dotted line 2—2 in Fig. 3. Fig. 3 is a cross section on the dotted line 3—3 in Fig. 2.

In the drawings, 1 designates the outer tube or casing, common to all steering devices, which is secured at a convenient point between the uppermost end of the steering device to the vehicle to-day. Immediately within the casing 1 is a tube 2 to which the steering wheel (not shown) is secured, and by which means the steering mechanism is operated. There are two other tubes 4 and 5 passing through the operating tube 2, which actuate the "sparker" and "throttle valve", but as these are common in all steering devices no further mention of them will be made, and I will therefore limit the description to the remaining parts which I consider new.

The lower end of the operating tube 2 engages an oil and dust casing 7. I provide the lower end of the tube 2 within the casing 7 with a sleeve 9 having screw-threads 10 of acute pitch on its periphery. The sleeve is rigidly secured to the tube 2 by means of the screws 11. See Fig. 1. The sleeve 9 could be formed integrally with the tube 2, but to simplify its manufacture and to enable me to form the threads and sleeve of stronger material I prefer to form the sleeve and tube separate. The lower end of the sleeve 9 rests upon the ball-cup 12 which forms a ball bearing to reduce the end thrust when pressure is applied. The upper ends of the sleeve abuts the cup 13 of a ball bearing joint at the top, and the sleeve and bearing are held in normal operating position by means of the nut 16 which screws into the upper end of the oil casing 7. It will thus be seen that when the operating tube 2 is rotated a similar movement is imparted to the sleeve.

I surround the peripherally threaded sleeve 9 with a hollow box 20 having a bore of a diameter slightly larger than the diameter of the sleeve. The space thus existing between the bore of the box and the surface of sleeve 1 is filled with Babbitt-metal so as to secure a neat joint between the two parts. The box 20 is substantially square and fits within the oil casing 7 to prevent it from turning, and as the operating tube 2 is rotated the box will be forced to travel longitudinally of the sleeve 9, through the action of the threads 10. The box 20 is provided on opposite sides with the racks 22, which may be formed integrally therewith. I prefer to form them separately, as shown in the drawings, for the reason that it may be desirable to use harder material, as said racks are subjected to considerable wear. Through continual wear the parts may become worn and cause play, which I propose to eliminate. The racks 22 are usually backed against the shoulders 23, projecting from the sides of the box 20. The screws 27 provide means for adjusting and keeping the racks 22 into contact with the toothed-segments 32, and the screws 25 provide means for securing the racks after they have been properly adjusted by the screws 27, heretofore mentioned. I also provide the keys 28 which engages notches in both the racks 22 and in the shoulders 23, and the purpose of the keys is to remove the strain and thus prevent the screws from being sheared.

Through the movement of the box 20 along the threaded sleeve 9 when the tube 2 is rotated, as has been pointed out, I intend to impart a rocking movement to the rock-shaft 30, which passes transversely through the oil casing 7 and in the rear of the box 20. To so operate the shaft 30 I provided the latter with the fixed sleeve 31. This sleeve is provided at each end with a segment 32, which extend in parallel planes. The segments straddle the box 20, and the extended ends of the segments are provided with teeth which engage corresponding teeth in the racks 22. Thus when the box 20 moves along the sleeve 9, movement will be imparted to the segments 32 and rock-shaft 30. The rock-shaft 30 terminates at one end in a crank-arm 36, to which the necessary connecting rod is attached in order to move the forward wheels of the machine. The connecting rod and other crank-arms leading therefrom are not shown, for the reason that their arrangement will depend on the class of machines to which the steering device is attached.

Having thus fully described my said invention, what I desire to secure by Letters Patent, is—

A steering device for automobiles and like vehicles comprising an operating-shaft provided at one end with exteriorly located threads, a sleeve surrounding the threaded portion of said operating-shaft and adapted to be actuated thereby, racks secured to both sides of said sleeve, toothed-segments adapted to engage the racks, means for adjusting the racks towards and from the segments, means for securing said racks, a rock-shaft actuated by the segments, and a housing to envelop said steering device.

In witness whereof, I, have hereunto set my hand and seal at Indianapolis, Indiana.

JOSEPH HORAT. [L. S.]

Witnesses:
F. W. WOERNER,
L. B. WOERNER